(12) United States Patent
Kawamoto et al.

(10) Patent No.: US 6,776,362 B2
(45) Date of Patent: Aug. 17, 2004

(54) ELECTROSTATIC PAINTING DEVICE

(75) Inventors: Akira Kawamoto, Kanagawa (JP); Takuya Matsumoto, Tokyo (JP)

(73) Assignee: Anest Iwata Corporation, Kanagawa (JP)

( * ) Notice: Subject to any disclaimer, the term of this patent is extended or adjusted under 35 U.S.C. 154(b) by 0 days.

(21) Appl. No.: 10/069,138

(22) PCT Filed: Jun. 29, 2001

(86) PCT No.: PCT/JP01/05644
§ 371 (c)(1),
(2), (4) Date: Jan. 9, 2003

(87) PCT Pub. No.: WO02/00354
PCT Pub. Date: Jan. 3, 2002

(65) Prior Publication Data
US 2003/0141391 A1 Jul. 31, 2003

(30) Foreign Application Priority Data
Jun. 29, 2000 (JP) ........................................ 2000-196904

(51) Int. Cl.[7] .............................................. B05B 5/00
(52) U.S. Cl. ........................................ 239/690; 427/8
(58) Field of Search ............................. 239/690, 690.1, 239/697, 702, 706; 427/8, 33

(56) References Cited

U.S. PATENT DOCUMENTS

| 4,092,440 A | 5/1978 | Wöhr et al. |
|---|---|---|
| 4,764,393 A | 8/1988 | Henger et al. |
| 5,939,993 A | 8/1999 | Burtin et al. |

FOREIGN PATENT DOCUMENTS

| GB | 2 132 832 | 7/1984 |
|---|---|---|
| JP | 58-17864 | 2/1983 |
| JP | 10-128710 | 5/1998 |

OTHER PUBLICATIONS

Microfilm of the specification and drawings annexed to the request of Japanese Utility Model Application No. 5959/1990 (Laid-open No. 98954/1991), Oct. 15, 1991.

Primary Examiner—Michael Mar
Assistant Examiner—Thach H Bui
(74) Attorney, Agent, or Firm—Wenderoth, Lind & Ponack, L.L.P.

(57) ABSTRACT

An electrostatic painting device in which spray coating may be carried out by keeping a spray distance of the electrostatic painting machine within an optimum distance range to provide good coating efficiency and to prevent a coating worker from extending unconsciously out of the optimum distance range. The electrostatic painting device includes an electrostatic spray gun (2) provided with a high voltage generation part (201) for supplying high voltage to an atomized painting material, a detection device (107) for detecting load current I which varies depending on a change of the spray distance L between the electrostatic spray gun (2) and an article (4) to be coated, a processing device (107) adapted to output an alarm signal when the detected load current falls below a threshold value, and an alarm (108) adapted to receive the alarming signal and provide an alarm indication.

5 Claims, 2 Drawing Sheets

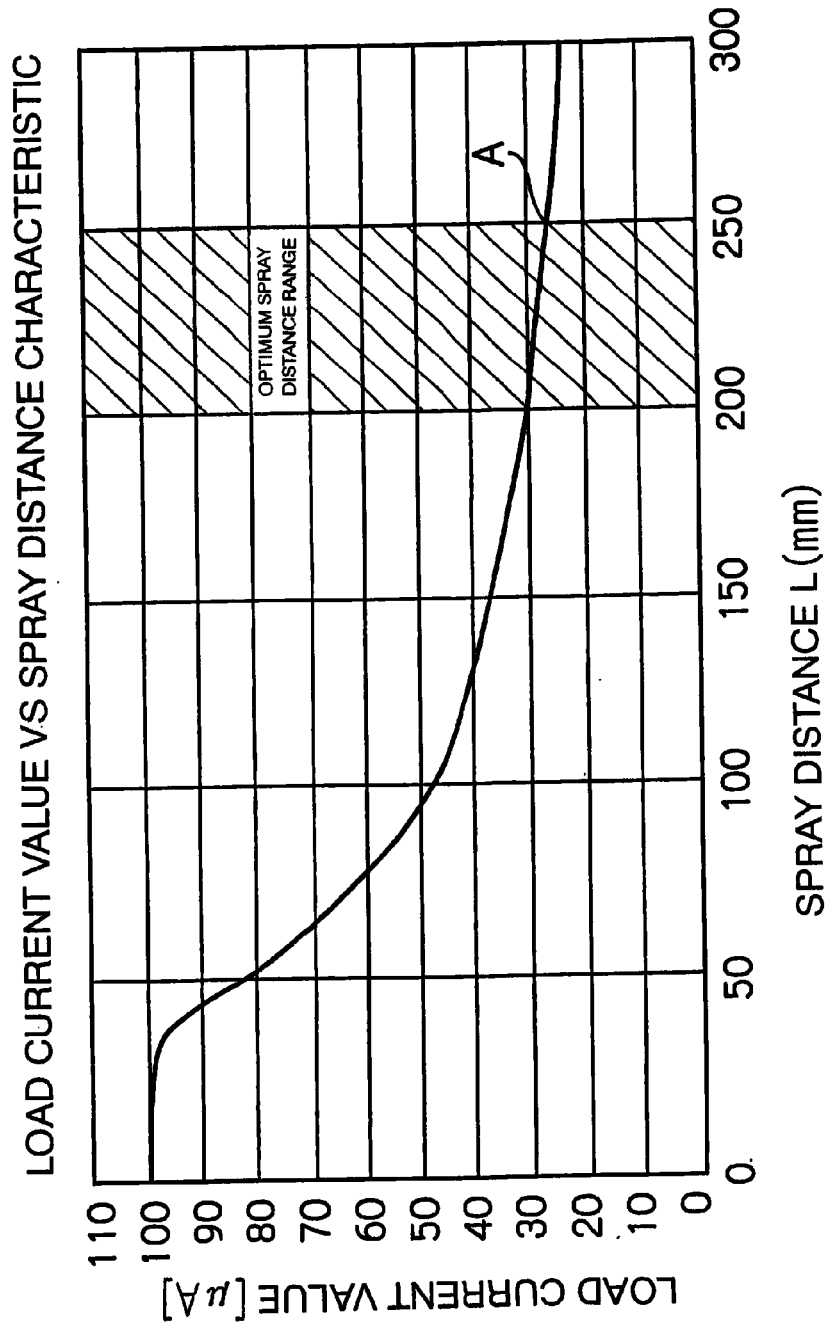

ELECTROSTATIC PAINTING DEVICE

BACKGROUND OF THE INVENTION

1. Field of the Invention

The present invention relates to an electrostatic painting device, and more specifically to an electrostatic painting device wherein a spray distance of an electrostatic spray gun relative to an article to be coated may be maintained so as to provide a good efficiency of spray coating.

2. Description of Related Art

An electrostatic painting device is so designed that particles of painting material which have been atomized are electrically charged and the thus atomized particles of painting material are electrostatically adhered on the article to be coated by using the electrostatic field formed between electrodes at an outlet of the electrostatic painting device and the article to be coated. An electrostatic painting method is highly appraised and widely utilized in view of excellent coating efficiency, enhanced productivity and protection against environmental pollution. As described in Japanese Patent Disclosure Publication No. Heisei 10-128170 which was disclosed on May 19, 1998, an electrostatic spray gun of internal pressure boosting type which incorporates a high voltage boosting circuit has been developed as an electrostatic painting machine. In order to allow the particles of painting material to be electrostatically adhered efficiently on the article to be painted, it is necessary to keep the spray distance of the electrostatic spray gun relative to the article to be coated within a specific proper range. Should the spray distance of the electrostatic spray gun relative to the article to be coated be too short (or should the electrostatic spray gun be placed too near to the article to be coated), a surface to be coated will get too coarse to obtain a good coated surface. On the contrary, should the spray distance be too far apart (or should the electrostatic spray gun be placed too far from the article to be coated), the effect of the electrostatic field will be degraded, resulting in an inability to maintain a good coating efficiency.

When carrying out coating work quickly without considering the maintaining of a high level of coating efficiency, the coating work may be performed more easily if the discharge amount of the painting material is increased and the spray distance is kept longer. On the other hand, when carrying out the spray coating work even though the discharge amount is not particularly increased but the spray distance is kept rather longer, formation of the film on the surface to be coated is performed without specific problems despite the coating efficiency and the speed of the coating work being rather decreased. Besides, by doing so, it is not necessary to pay too much attention to keeping the distance between the spraying gun and the article to be coated within an optimum range of distance. Since it is possible to execute coating even though the electrostatic spray gun is held somewhat roughly, there is a tendency for the coating workers to unconsciously keep the spray distance rather longer.

In the meantime, if the spray distance is kept shorter, or the spraying gun is brought nearer to the article relative to the optimum spray distance, the surface to be coated may become rather coarse, resulting in the need to re-spray the coating. Furthermore, if the spray distance is too short, over-load electric current will be caused to flow through the electrostatic spray gun, and a control may sense this over-load current to provide an abnormal indication or suspend high voltage charging and spraying of the painting material on the safe side. Under these circumstances, a worker tends to unconsciously keep the spray distance longer rather than shorter.

According to the conventional electrostatic painting machine, since no measures were taken for detection devices or the like to detect if the spray distance is longer than the specified proper distance, keeping the spray distance within a proper range depended on the vigilance of the workers. More recently, however, as the issue of global environmental pollution prevention becomes increasingly more important, so too does the need to maximize the coating efficiency and limit the environmental air pollution due to wasteful spraying of painting material. For example, if the normal to optimum spraying distance of 200–250 mm is increased to 300 mm, the spray coating efficiency may be decreased by a few percent, although this depends on the shape of the article to be coated and the kind of the painting material to be used.

An object of the present invention is to provide an improved electrostatic painting device wherein coating work may be performed while keeping the spray distance of the electrostatic spray machine, relative to the article to be coated, within an optimum distance range, thereby optimizing coating efficiency and preventing the workers from unconsciously extending the spray distance out of the optimum distance range.

Another object of the present invention is to provide an electrostatic painting device wherein in the case that the spray distance is longer than the optimum distance range, intensity indication may be proportional to the length of the spray distance.

SUMMARY OF THE INVENTION

In order to attain the objects as above mentioned, the electrostatic painting device according to the present invention comprises an electrostatic painting machine provided with a high voltage generation part adapted to supply high voltage to the atomized painting material, detection means adapted to detect load current which varies depending on the spray distance between the painting machine and the article to be coated processing means having a threshold corresponding to the maximum distance within the optimum spray distance range and adapted to output an alarm signal when the detected load current falls below the threshold and alarming means adapted to receive the alarm signal and provide an alarm indication.

According to an embodiment of the present invention, the processing means is adapted to output an alarm signal in proportion to the difference between the threshold and the detected load current when the detected load current falls below the threshold while the alarming means is adapted to provide the alarm indication of the intensity corresponding to the alarm signal. Thereby, the approximate length of the spray distance between the information regarding the electrostatic painting machine and the article to be coated may be provided to the coating workers. According to a further embodiment of the present invention, the threshold corresponding to the maximum distance may be set by adjusting it separately for each electrostatic painting machine based on the relationship between the spray distance of the electrostatic painting machine and the load current.

BRIEF EXPLANATION OF THE DRAWINGS

FIG. 2 illustrates a relationship between a spray distance L and a load current I in the apparatus shown in FIG. 1.

DETAILED DESCRIPTION OF THE INVENTION

Figure 1:
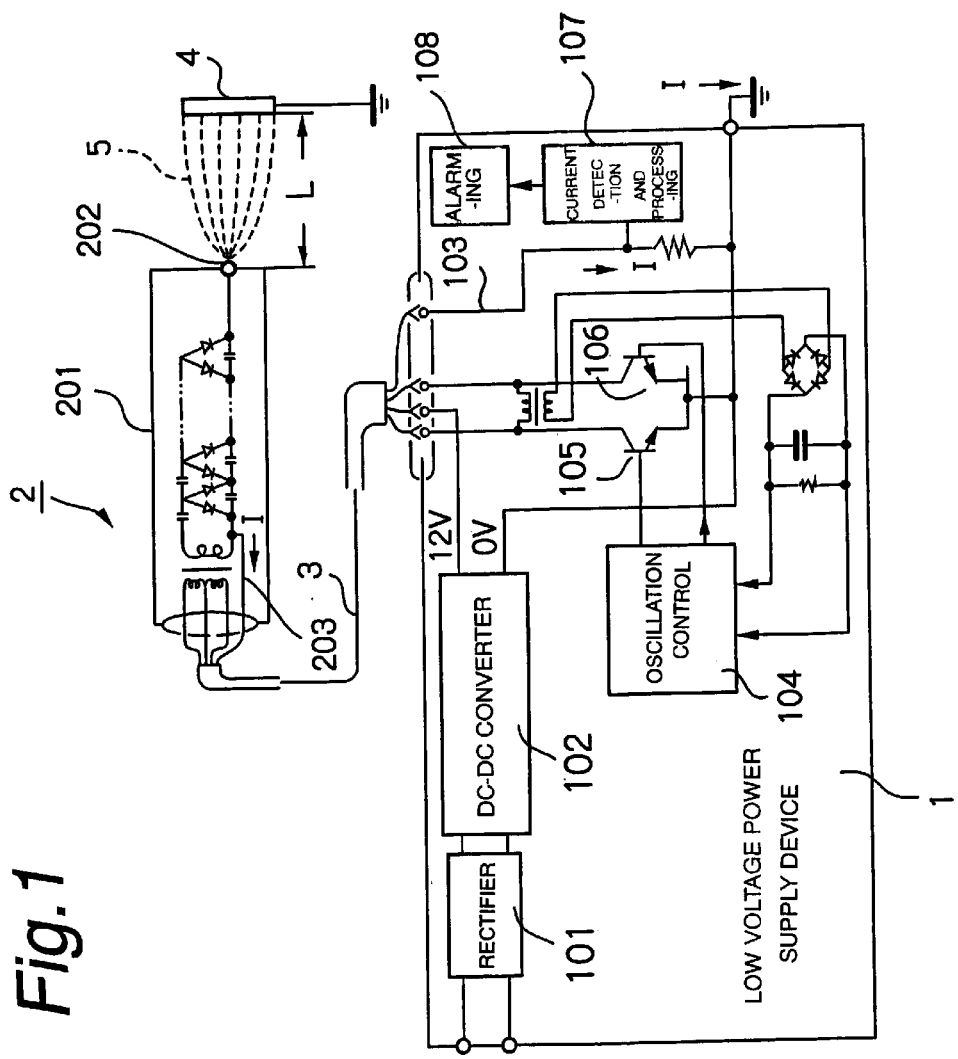
FIG. 1 is an overall structural drawing representing an embodiment of the electrostatic painting device according to the present invention.

An embodiment of the present invention will now be explained in more detail by referring to the accompanying drawings.

FIG. 1 is the schematic structural drawing of the overall circuit of the electrostatic painting device and specifically illustrates a condition in which the electrostatic spraying gun is used to spray the painting material onto the article 4 to be coated at the spray distance L. The present electrostatic painting device principally comprises a low voltage power supply source 1 and an electrostatic spray gun 2 which is an electrostatic painting machine of a type adapted to atomize painting material by use of compressed air. For clarity of explanation, only structures of the electrostatic gun 2 necessary for explanation are illustrated while the remaining parts are not shown. The low voltage power supply source 1 is adapted to convert the voltage supplied from a commercial power source (not shown) to DC current of 12 V by way of a rectifier 101 and a DC/DC converter 102 and supply the DC voltage to the electrostatic spray gun 2 at a specified frequency via a low voltage cable 3. In the electrostatic spray gun 2, there is incorporated a high voltage generation cartridge 201 provided with Cockcroft-Walton accerelator. The DC voltage thus supplied is here converted to high voltage of −60kv and supplied to electrodes 202 arranged at the tip end of the electrostatic spray gun. On the other hand, the painting material which has been supplied from a painting material supply device (not shown) is atomized by the electrostatic spray gun to become atomized particles of painting material which are, in turn, injected into electrostatic field 5 formed by electrodes 202 and the article to be coated and so accelerated as to be adhered electrostatically onto the article 4 to be coated which is grounded. At this time, the load current I is caused to flow between the electrodes 202 and the article 4 to be coated. This load current I is directed through the electrodes 202 and a current feedback line 203 and the cable 3 to a line 103 with one end of the low voltage power supply device 1 being grounded thereto.

It is to be noted that an oscillation control circuit 104 and a pair of transistors 105, 106 are provided in the low voltage power supply device 1. The oscillation control circuit has such a function as to deliver the low voltage at a specified frequency to the high voltage generation cartridge 201 in order to efficiently generate high voltage by activating alternately the transistors 105, 106 at frequencies of driving signals of which phases are displaced by 180 degrees. The low voltage power supply device 1 is further provided with an electric current detection processing device 107 adapted to detect and process the load current I flowing through the line 103 and an alarming device 108 connected to the electric current detection and processing device 107. The electric current detection and processing device 107 comprises an electric current detection section adapted to detect the load current flowing through the line 103, a comparison section adapted to compare the detected current with the predetermined threshold current, and an amplification section adapted to amplify the differential current between the detected current and the threshold current.

FIG. 2 illustrates a relationship between the spray distance L and the load current I. It is to be understood that, in general, a recommended spray distance L (i.e. optimum spray distance range, as indicated by the oblique lines in FIG. 2) =200~250 mm and the spray distance L in neighborhood of the optimum spray distance are substantially proportional to the load current I. Since the load current I corresponding to the maximum value of the optimum spray distance (designated by A in FIG. 2) or 250 mm is 26 $\mu$A, this current value of 26 $\mu$A is set as the threshold stored in the comparison section of the current detection and processing device 107. Since the individual electrostatic spray gun has an inherent relationship between the spray distance L and the load current I, the maximum distance in the optimum spray distance range is determined based on the respective data, and set individually as the respective threshold. In this instance, the thresholds are adjusted and set in consideration of such parameters as the climatic condition, the kinds of painting material, the thickness of coating, and the like.

The term "distance" as herein used will be now explained. "Spray distance" signifies the distance between the tip end portion of the painting machine and the surface of the article to be coated. Throughout the present specification, the reason why the distance L between the electrodes 202 of the electrostatic spray gun 2 and the article 4 to be coated as shown in FIG. 1 is referred to as the spray distance is to follow the terminology commonly used in the industries in interest. As shown in FIG. 2, the distance between the electrodes 202 of the electrostatic spray gun 2 and the article 4 to be coated is proportional to the load current I. Furthermore, since it can be seen that the distance between the electrostatic spray gun 2 and the article 4 to be coated is substantially equivalent to the distance between the electrodes 202 of the electrostatic spray gun 2 and the article 4 to be coated, it does not seem necessary to differentiate between these distances in the present patent application.

The comparison section of the current detection and processing apparatus 107 is so designed as to provide an alarming signal output to the alarming device 108 if the detected current value I falls below the predetermined threshold. The alarming device 108 is so adapted as to provide the worker with alarming sounds and alarming lamp display or melodic sounds or the like for calling attention, based on the alarming signal output. Due to these alarming measures, the worker may be informed of the fact that the spray distance L was too long or the electrostatic spray gun was placed too far apart from the article to be coated and thus immediately take action to restore the spray distance L back into the optimum distance range.

The current detection and processing device 107 may be also designed so that the amplification section is caused to output to the alarming device 108 such signals as proportional to the difference between the threshold and the detected load signals when the spray distance L has been extended after the comparison section outputs the alarming signals and as a result the load current I has been decreased. The alarming device 108 is capable of increasing the volume of the alarming sound or flashing times of the alarming lamp in accordance with the signals which are inversely proportional to the reduction of the load current I. In this manner, the worker is able to know the approximate spray distance L of the electrostatic spray gun relative to the article to be coated visually and audibly while he is engaged in the painting work.

Typical effects, which can be attained by the present invention as above explained above are summarized as follows.

(1) Since the worker can easily know the spray distance has been placed too far from the optimum distance range relative to the article to be coated while he is engaged in the coating work, he can readily restore the spray distance within the optimum distance range, and thereby attaining the spray distance in which a good coating efficiency may be maintained.

(2) In the case that the spray distance of the electrostatic spray gun relative to the article to be coated is further separated from the optimum distance range, the worker may easily know the approximate spray distance which is already too long relative to the article to be coated while he is engaged in the coating work.

The electrostatic spray gun of the type wherein the painting material is atomized by the compressed air and then electrically charged has been explained as an embodiment of the optimum electrostatic painting device according to the present invention has been described as above. It is to be noted, however, that the present invention will not be limited to that type of embodiment, but may also be applied to an electrostatic painting machine of an electrostatic rotary atomization type in which compressed air is not used but the painting material is discharged from the circumference of the cup in the form of a thin film due to the centrifugal . The cup rotates at a high speed and the painting material is transformed into particles due to the repulsion force of the electrostatic power. It is also possible that the processing section of the current detection and processing device 107 consists of the integrated circuit, such that the processing after detection of the current may be executed by the software and the thresholds may be freely established. Accordingly, the present invention should not be limited to the disclosed embodiment but various changes and modifications may be made. In this sense, the present invention is intended to be limited only by the claims as appended.

What is claimed is:

1. An electrostatic painting device comprising;
   an electrostatic painting machine having a high voltage generation part adapted to supply high voltage to atomized paint material;
   detection means for detecting load current flowing between an electrode of said high voltage generation part and an article to be coated, wherein the load current varies depending on a change of a spray distance between said electrostatic painting machine and the article to be coated;
   processing means for outputting an alarm signal when a detected load current falls below a threshold load current value, which corresponds to a maximum distance within an optimum distance range of said spray distance;
   wherein the threshold load current value, corresponding to the maximum distance, is determined for the electrostatic painting, device in consideration of a relationship between the spray distance of the electrostatic painting machine and the load current; and
   alarm means for receiving the alarm signal and providing an alarm display.

2. An electrostatic painting device according to claim 1, wherein the alarm signal, output by said processing means, is proportional to a difference between the threshold load current value and the detected load current, and said alarm means provides an alarm indication, the intensity or which, corresponds to said alarm signal when said detected load current falls below the threshold load current value.

3. An electrostatic painting device comprising;
   an electrostatic spray gun including a high voltage generation cartridge and electrodes arranged at an end of said electrostatic spray gun so that an electrostatic field can be formed by said electrodes and an article to be coated;
   a low voltage power supply device electrically connected to said electrostatic spray gun, said low voltage power supply device including an alarm device and an electric current detection and processing device for detecting and processing a load current flowing between the electrodes and the article to be coated,
   said electric current detection and processing device including an electric current detection section adapted to detect the load current flowing between the electrodes and the article to be coated, and a comparison section adapted to compare the detected load current with a predetermined threshold current value, which corresponds to a maximum value of an optimum spray distance for the painting device; and
   an alarm device connected to said electric current detection and processing device,
   wherein said predetermined threshold current value is stored in said comparison section, and said comparison section is operable to output an alarm signal to said alarm device if a detected load current value is less than the predetermined threshold current value, and
   wherein said alarm device is operable to provide an alarm in response to an alarm signal output from said comparison section.

4. An electrostatic painting device according to claim 3, wherein the alarm signal, output by said comparison section, is proportional to a difference between the threshold load current value and the detected load current.

5. An electrostatic painting device according to claim 4, wherein the alarm device is operable to provide an alarm having an intensity that corresponds to the alarm signal output by said comparison section.

* * * * *